US012242572B1

(12) United States Patent
Mohan et al.

(10) Patent No.: US 12,242,572 B1
(45) Date of Patent: Mar. 4, 2025

(54) REAL TIME, COMPACT, DYNAMIC, TRANSFER LEARNING MODELS

(71) Applicant: ANSYS, INC., Canonsburg, PA (US)

(72) Inventors: Srinivasa Mohan, Pune (IN); Aniruddha Mukhopadhyay, Pittsburgh, PA (US); Siddhartha Mukherjee, Pittsburgh, PA (US); RaviKumar Devaki, Tokyo (JP)

(73) Assignee: ANSYS, INC., Canonsburg, PA (US)

( * ) Notice: Subject to any disclaimer, the term of this patent is extended or adjusted under 35 U.S.C. 154(b) by 440 days.

(21) Appl. No.: 17/457,168

(22) Filed: Dec. 1, 2021

(51) Int. Cl.
G06F 18/25 (2023.01)
G06N 20/00 (2019.01)
H04L 67/12 (2022.01)

(52) U.S. Cl.
CPC ............. *G06F 18/25* (2023.01); *G06N 20/00* (2019.01); *H04L 67/12* (2013.01)

(58) Field of Classification Search
None
See application file for complete search history.

(56) References Cited

FOREIGN PATENT DOCUMENTS

| CN | 113240117 A | * | 8/2021 | ............ | G06F 30/27 |

OTHER PUBLICATIONS

English machine translation of CN 113240117 A (Year: 2021).*
Lei He, Weiqi Qian, Tun Zhao, Qing Wang, "Multi-Fidelity Aerodynamic Data Fusion with a Deep Neural Network Modeling Method", Entropy 2020, 22, 1022: doi:10.3390/e22091022, www.mdpi.com/journal/entropy, 17 pages.

* cited by examiner

Primary Examiner — Walter L Lindsay, Jr.
Assistant Examiner — Geoffrey T Evans
(74) Attorney, Agent, or Firm — WOMBLE BOND DICKINSON (US) LLP

(57) ABSTRACT

A method and apparatus of a device for generating a fusion model for a physical system is described. In an exemplary embodiment, the device receives low-fidelity input data and low-fidelity output data that represent a low-fidelity measurement of a physical system. In addition, the device trains a first model to predict the low-fidelity output data using the low-fidelity input data. Furthermore, the device receives high-fidelity input data and high-fidelity output data that represent a high-fidelity measurement of the physical system. The device additionally invokes the first model with the high-fidelity input data to generate predicted low-fidelity data. The device further trains a second model to predict the high-fidelity output data using the high-fidelity input data augmented with the predicted low-fidelity data. In addition, the device creates a fusion model for the physical system based on the first model and the second model, the first model and the second model to receive input to the fusion model, the second model to receive output from the first model, and output of the fusion model corresponding to output of the second model.

20 Claims, 9 Drawing Sheets

REAL TIME, COMPACT, DYNAMIC, TRANSFER LEARNING MODELS

FIELD OF INVENTION

This invention relates generally to model processing and more particularly to generating real-time, compact, dynamic, and transfer learning models.

BACKGROUND OF THE INVENTION

Development of physical systems (product) can lead to expensive physical testing and validation. Engineering software analysis tools only enable verification of the physical system, but not its performance validation. In addition, variability and uncertainty is introduced during manufacturing and during operations of the physical system (e.g., noise and stochastic factors). This variability and uncertainty can cause a difference in the performance of the physical system from the as designed model that is hard to model using software tools.

This incomplete understanding of physics of the system hampers development of accurate models. Models that account for more physics leads to complex models and this leads to expensive computations.

SUMMARY OF THE DESCRIPTION

A method and apparatus of a device for generating a fusion model for a physical system is described. In an exemplary embodiment, the device receives low-fidelity input data and low-fidelity output data that represents a low-fidelity model of a physical system. In addition, the device trains a first model to predict the low-fidelity output data using the low-fidelity input data. Furthermore, the device receives high-fidelity input data and high-fidelity output data that represent a high-fidelity measurement of the physical system. The device additionally invokes the first model with the high-fidelity input data to generate low-fidelity data at the high-fidelity operating conditions. The device further trains a second model to predict the high-fidelity output data using the high-fidelity input data augmented with the predicted low-fidelity data. In addition, the device creates a fusion model for the physical system based on the first model and the second model, the first model and the second model to receive input to the fusion model, the second model to receive output from the first model, and output of the fusion model corresponding to output of the second model.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
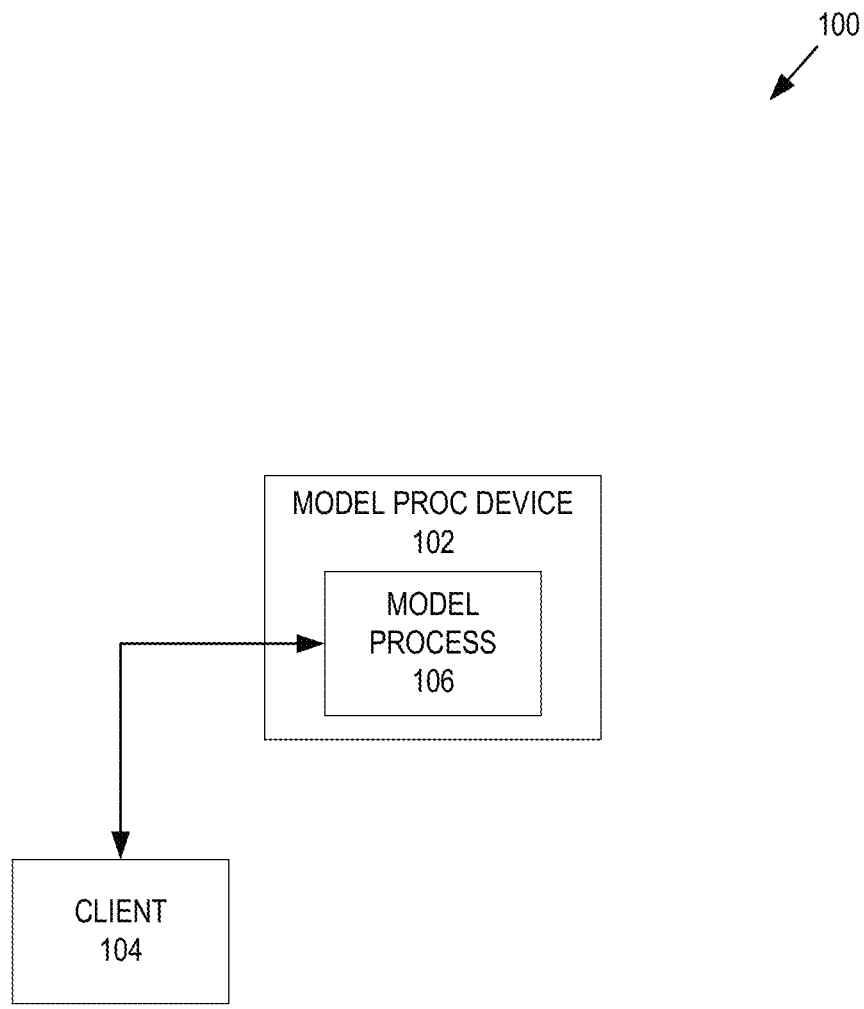
FIG. 1 is an illustration of one embodiment of a system that includes a model processing server that generates, real-time, compact, dynamic, and transfer learning models.

A method and apparatus of a device for generating a fusion model for a physical system is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device for generating a fusion model for a physical system is described. In one embodiment, product testing and validation can be expensive as physical production and testing is required for validation of the overall product. For example, variability and uncertainty can be introduced during manufacturing and during operations (e.g., noise and stochastic factors). In addition, incomplete understanding of various physical phenomena leads to inaccurate models. Improving accuracy demands complex models with significantly higher computational costs.

Also, there is a need for the calibration of phenomenological physics-based models to account for performance variations from input conditions, and dimensional tolerance variations from one manufactured instance to another. In one embodiment, a model that combines results from physics-based models of different fidelities (maybe inaccurate but correlated with measurements) and small amounts of measurements based on (noisy) historical/testing data can be developed. In particular, this model can go beyond "parameter calibration" of known physical models by capturing effects of residual physics through measurements and machine learning. Furthermore, this model can overcome limitations of a data only model by relying on physics models for broad support for robust interpolation, extrapolation and uncertainty quantification. The model additionally relies on observations for accuracy and quantifying unmodeled physics.

In one embodiment, a device can receive low-fidelity data that includes input and output data that represent a low fidelity measurement of a physical system. The device can further augment the low-fidelity data with simulation-based data using virtual sensors. In one embodiment, a virtual sensor is defined by a physical model, where the virtual sensor is a virtual estimate of data in a physical model. For example, and in one embodiment, a virtual sensor could be a temperature measurement in a reactor of a physical model or a measurement of a velocity of a particle five centimeter from a reactor wall in the physical model. In a further embodiment, a virtual sensor is a type of software that, given the available information, processes what a physical sensor otherwise would. In this embodiment, the virtual sensor can learn to interpret the relationships between the different variables, and observed readings from the different instruments. In one embodiment, augmenting a data set with additional data can include adding this additional data to the original data set. For example, and in one embodiment, augmenting the low-fidelity data with data from virtual sensor data can update or transform the low-fidelity data by adding the input and output data of the virtual sensor data to the low-fidelity input and output data, respectively.

In one embodiment, low-fidelity data is lower accuracy data that is lower than expected. For example, and in one embodiment, the low-fidelity data can include low accuracy simulation data or low accuracy physical measurement data. In a further embodiment, low-fidelity data can include any data that was produced by a person or Stochastic Process that deviates from the real-world system of interest. For example, low-fidelity data can be produced by models of a physical system that use approximations to simulate the system, rather than modeling the system in an exhaustive manner.

In one embodiment, the device can further train a first set of models using the augmented low-fidelity data. The device can further receive high-fidelity data that includes input and output data that represent a high-fidelity measurements of a physical system. In one embodiment, high-fidelity data includes data that was produced by a person or Stochastic Process that closely matches the operational context of interest. For example, in wing design optimization, high-fidelity data uses physical models in simulation that produce results that closely match the wing in a similar real-world setting. In human-in-the-loop situations, high fidelity data would be produced from an operational expert acting in the technological and situational context of interest. The device can further evaluate low-fidelity predictions at high-fidelity conditions; augments the high-fidelity input data with low-fidelity predictions for predicting high fidelity output data.

The device may also train a second set of models using the augmented input data and the high-fidelity data and evaluate a leave-one-out based production for the data points. The device may also choose the best model from each set of models on the leave-one-out error. The device can further create a fusion model from the chosen machine learning models.

With the chosen fusion model, the device has generated a real-time, compact, dynamic and transfer-learning model. In one embodiment, a model is said to be compact if this model compresses large information with a reduced computing memory footprint. In one embodiment, the fusion model transfers knowledge from previous generation models. This improves the efficiency of the device generating the fusion model as this device does not need to regenerate the features of the previous generation model from scratch. For example, and in one embodiment, if a previous model is a model of a physical system (e.g., a wind turbine), the fusion model would take advantage of the previous model for the wind turbine model and be a compact fusion model that adds dynamic features to the model (e.g., gradient features to the model). In one embodiment, the device extends a multi-fidelity model to enable Transfer Learning across family of product designs by augmenting lower fidelity datasets with virtual sensors to characterize nonparametric design elements implicitly, and additional information from adjoints and gradients. In addition, the device makes physics-based predictions primary through greedy optimization for the enhanced success of transfer learning.

The chosen fusion model can further create extensions of multi fidelity models for Dynamic Performance of product designs. In one embodiment, the device augments low and/or high-fidelity datasets with time derivatives (first order and higher, and finite differences) in an automated manner. In a further embodiment, the device can extend multi-fidelity models for Inference in Real Time by pre-calculating the invariant and costly operations of Gaussian process kernels for inference in real time even for large datasets. In addition, the fusion model can be used to efficiently simulate physical systems, such as physical devices, processes, and/or systems (e.g., a ship, a semisubmersible, a riser, a wind turbine, and/or another type of device).

FIG. 1 is an illustration of one embodiment of a system 100 that includes a model processing device 102 that generates, real-time, compact, dynamic, and transfer learning models. In FIG. 1, the system 100 includes a client 104 that is coupled with the model processing device 102, where the model processing device 102 is used to generate models for a physical system (e.g. a real-time, compact, dynamic, and/or transfer learning model). In this embodiment, the model processing device 102 can be a personal computer, laptop, server, mobile device (e.g., smartphone, laptop, personal digital assistant, music playing device, gaming device, etc.), and/or any device capable processing data. Furthermore, and in one embodiment, the client 104 can be a personal computer, laptop, server, mobile device (e.g., smartphone, laptop, personal digital assistant, music playing device, gaming device, etc.), and/or any device capable sending, transmitting, and/or presenting data.

Figure 2:
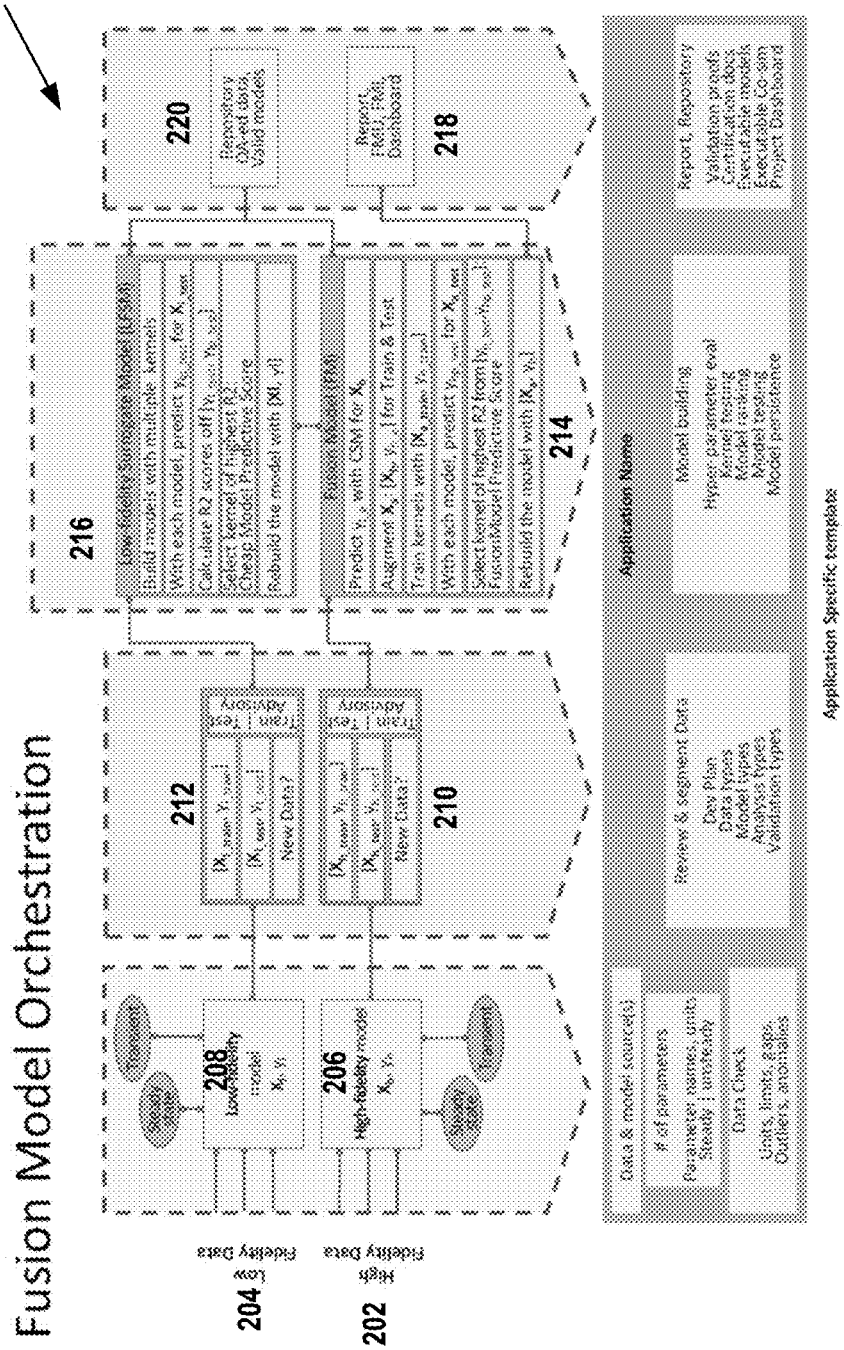
FIG. 2 is a block diagram of one embodiment of a model processing that performs a fusion model orchestration.

FIG. 2 is a block diagram of one embodiment of a model process 200 that performs a fusion model orchestration. In FIG. 2, the model process 200 includes input, that in one embodiment, includes high-fidelity data 202 and low-fidelity data 204 of a physical system. In one embodiment, the high-fidelity data 202 is high accuracy data that can include high accuracy input data and output data. In one embodiment, the high-fidelity data 202 can include highly accurate physical measurements of input and/or output data. In another embodiment, the high-fidelity data 202 can include highly accurate simulation data from a complex model that is expensive to run. For example, and in one embodiment, high-fidelity data can be the measurement of pollutants that arise during combustion in an internal combustion engine. Due to inherent variabilities in the combustion process, and noise factors over which the experimenter has no control, measurements for the same operating conditions result in measurements which are statistically distributed over a mean.) In one embodiment, low-fidelity data 204 is lower accuracy data that is lower than expected. For example, and in one embodiment, the low-fidelity data 204 can include low accuracy simulation data or low accuracy physical measurement data. For example, and in one embodiment, low-fidelity data can be model predictions for pollutants from a physics-based models. The incompleteness of physics in these models may lead to significant errors ($R^2$~~15.0-0.9) for various kinds of pollutants of interest. For the fusion model, we are interested more in their correlation (Pearson or rank) which are typically in the range of 0.15-0.9 as better indicator of usefulness for the fusion model. In one embodiment, the low-fidelity model 208 and/or high-fidelity model 206 can be output to data and/or model sources (e.g., number of parameters, parameter names, units, steady or unsteady variables). In addition, there can be a data check on one or more different aspects of the low-fidelity model 208 and/or high-fidelity model 206 (e.g., units, limits, gaps, outliers, anomalies, and/or other aspects of these models).

In one embodiment, the model process 200 uses the high-fidelity data 202 and/or the low-fidelity data 204 to create high-fidelity model 206 and/or low-fidelity model 208, respectively. In one embodiment, the expensive model uses high-fidelity data ($x_h$, $y_h$) to train and test data for the expensive model 206. The expensive model 206 can include steady state data and/or transient data. In one embodiment, steady state data is time-independent data and transient data is time-dependent data. For example, and in one embodiment, the low-fidelity model uses the low-fidelity data 204 to train and test the low-fidelity model 208. The low-fidelity model 208 can include steady state data and/or transient data. In one embodiment, the x data in an input to a model and y is the output for the corresponding input.

The model process 200 uses the expensive model 206 to generate training data for the fusion model. In one embodiment, the model process 200 is used to train a training set of expensive data [$x_{h\_train}$, $y_{h\_train}$] and a test set of expensive data [$x_{h\_test}$, $y_{h\_test}$] (210). In addition, the model process 200 uses the low-fidelity model 208 to generate training data for the fusion model. In one embodiment, the model process 200 is used to train a training set of low-fidelity data [$x_{l\_train}$, $y_{l\_train}$] and a test set of low-fidelity data [$x_{l\_test}$, $y_{l\_test}$] (212). Model process 200 uses these two sets of data to for model creation. In one embodiment, the model process 200 create a low-fidelity surrogate model (LFSM) (216) using the training set of low-fidelity data [$x_{l\_train}$, $y_{l\_train}$] and the test set of low-fidelity data [$x_{l\_test}$, $y_{l\_test}$]. In one embodiment, model process 200 builds model with multiple kernels. For each of these models, model process 200 predicts $y_{lp\_test}$ using $x_{l\_test}$. Model process 200 further a regression value (e.g., R2) using [$y_{l\_test}$, $y_{lp\_test}$] and selects the kernel with the highest regression value, which is the low-fidelity model predictive score. Model process 200 rebuilds the low-fidelity model 208 with the using the selected kernel, where the selected kernel becomes the LFSM. In one embodiment, a user may review and segment the data (e.g., the development plan, data types, model types, analysis types, and/or validation types).

In another embodiment, the model process 200 generates a fusion model (214). In this embodiment, the model process 200 predicts output data $y_{l\_e}$ using the LFSM (e.g. a first model) for $x_h$. The model process 200 additionally trains and tests a second model using an augmented set of input data, $x_a$, corresponding to [$x_h$, $y_{l\_h}$] for training and testing the second model. The augmented dataset is the data that combines the original operating conditions $x_h$ with the corresponding low-fidelity predictions at the same conditions $y_{l\_h}$. Model process 200 trains multiple kernels with [$x_{h\_train}$, $y_{h\_train}$]. With each model, process 200 predicts $y_{hp\_test}$ for $x_{a\_test}$, where model process 200 selects a kernel (e.g. a second model) based on the regression score or fusion predictive score (e.g., based on R2 value) associated with [$y_{h\_test}$, $y_{hp\_test}$]. Model process 200 rebuilds the fusion model with [$x_a$, $y_h$]. In one embodiment, this rebuilt model is the fusion model comprising LSFM as the first model and the second model. In one embodiment, the low-fidelity surrogate model 216 and/or fusion model 214 can be used in various other actions (e.g., model building, hyper-parameter evaluation, kernel testing, model ranking, model testing, model persistence, other actions, and/or a combination thereof).

In a further embodiment, the model process 200 stores the LFSM and fusion model in a repository, along with data tested by quality assurance processes and validation models (220). In addition, model process generates reports and/or adds the model to a dashboard. In one embodiment, a functional mockup unit (FMU) is a self-contained digital model that can be used as a surrogate in another simulation model. in addition, the functional mockup interface (FMI) is an interface that satisfies a standard for model interchange (e.g. https://fmi-standard.org/or another standard for model interchange. In one embodiment, the LFSM and/or fusion models can subject to other actions (e.g., validation proofs, certification documentation, executable models executable co-simulations, project dashboard, other actions, and/or a combination thereof).

Figure 3:
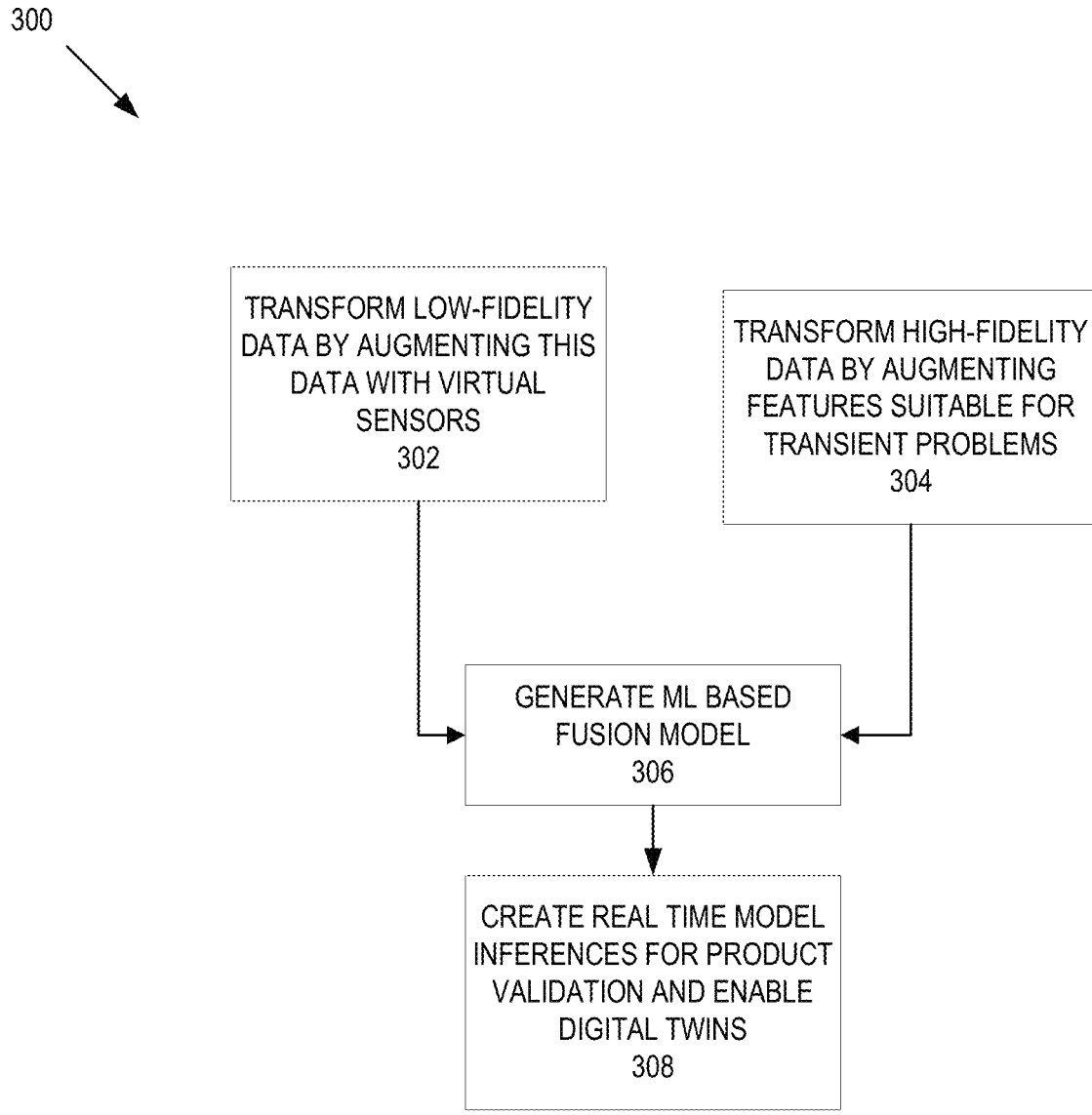
FIG. 3 is a flow diagram of one embodiment of a process to perform a fusion model orchestration.

FIG. 3 is a flow diagram of one embodiment of a process 300 to perform a fusion model orchestration. In one embodiment, the model processing device 102 performs the fusion model orchestration. In FIG. 3, process 300 begins by transforming low-fidelity data by augmenting this data with virtual sensors to generate augmented low-fidelity data at block 302. In one embodiment, low-fidelity data is lower accuracy data that is lower than expected. For example, and in one embodiment, the low-fidelity data can include low accuracy simulation data or low accuracy physical measurement data. For example, and in one embodiment, the low-fidelity data is generated from model instead of being from a measurement. In one embodiment, process 300 utilizes virtual sensors to characterize non-parametric design elements implicitly. In addition, process 300 obtains additional information from adjoints and gradients. In one embodiment, a virtual sensor is defined by a physical model, where the virtual sensor is a measurement of data in a physical model. For example, and in one embodiment, a virtual sensor could be a temperature measurement in a reactor of a physical model or a measurement of a velocity of a particle five centimeter from a reactor wall in the physical model. Transforming the low-fidelity data is further described in FIG. 4 below.

At block 304, process 300 transforms high-fidelity data by augmenting features of the high-fidelity data with features suitable for transient problems to generate the augmented high-fidelity data. In one embodiment, the high-fidelity data is high accuracy data that can include high accuracy input data and output data. In one embodiment, the high-fidelity data can include highly accurate physical measurements of input and/or output data. In another embodiment, the high-fidelity data can include highly accurate simulation data from a complex model that is expensive to run. Transforming the high-fidelity data is further described in FIG. 5 below.

Process 300 generates the machine learning based fusion model at block 306. In one embodiment, process 300 generates the machine learning based fusion model using the augmented low-fidelity data and the augmented high-fidelity data to create two models, a steady-state model and a transient-state model. Process 300 further fuses the models to create a fusion model. Generating the machine learning based fusion model is further described in FIG. 6 below.

At block 308, process 300 creates real-time model inferences for product validation and enables a digital twin for the machine learning based fusion model. Creating the real-time model inferences for product validation and enabling a digital twin for the machine learning based fusion model is further described in FIG. 7.

Figure 4:
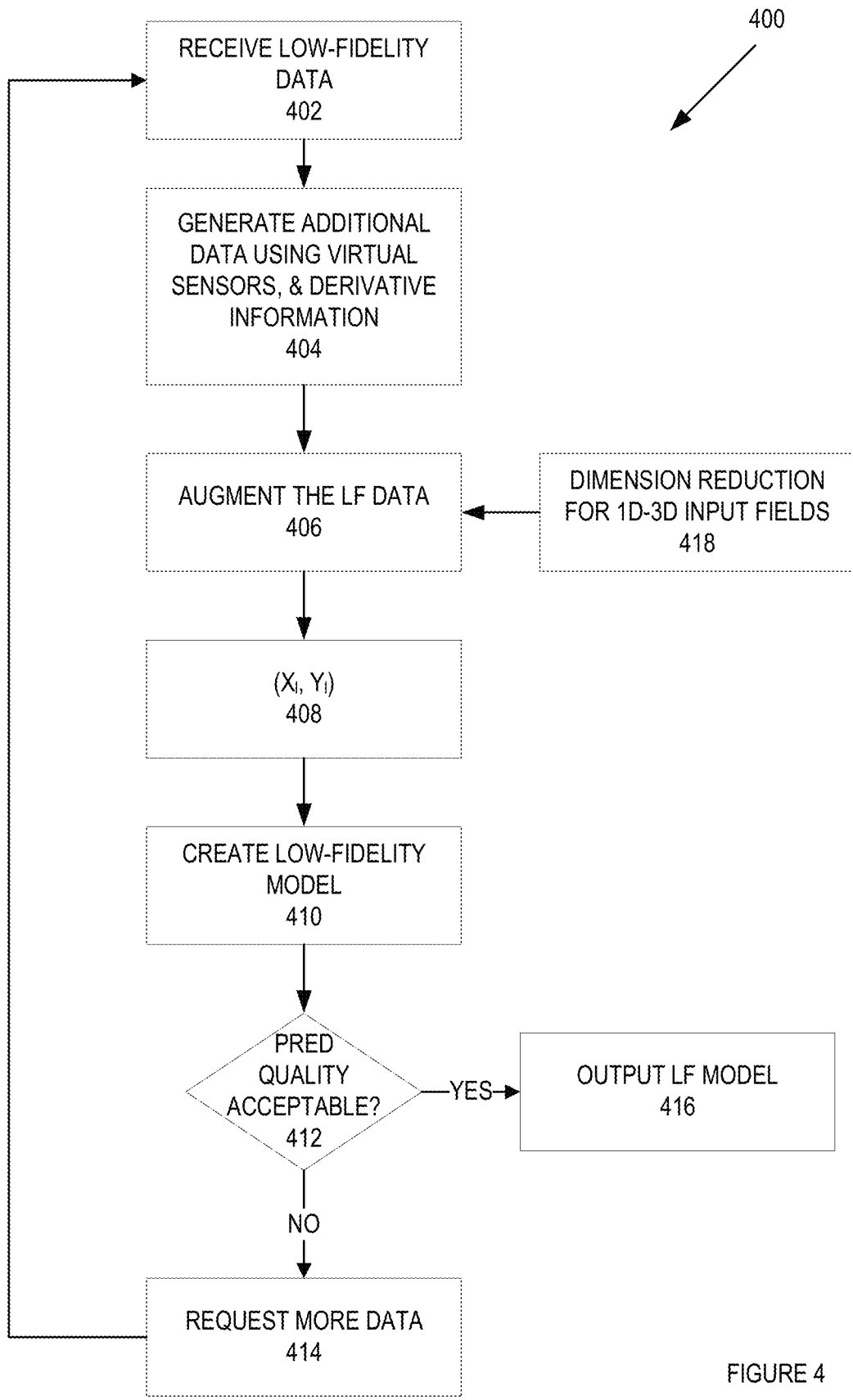
FIG. 4 is a flow diagram of one embodiment of a process to transform low-fidelity data by augmenting this data with virtual sensors.

FIG. 4 is a flow diagram of one embodiment of a process 400 to transform low-fidelity data by augmenting this data with virtual sensors. In FIG. 4, process 400 begins by receiving the low-fidelity data at block 402. At block 404, process 400 generates additional data using one or more virtual sensors and derivative information. In one embodiment, a virtual sensor is the estimate of a physics-based model for a variable. In addition to the output, a physics-based model can produce as estimates of various information. These outputs can serve as an implicit "parameter" for design modifications. In one embodiment, a virtual sensor is defined by a physics model, where the virtual sensor is an estimate of data in a physics-based model. For example, and in one embodiment, a virtual sensor could be a temperature estimate in a reactor of a physical model or an estimate of a velocity of a particle five centimeter from a reactor wall in the physical model. In one embodiment, the derivative information can be first and/or higher derivative information and/or can be finite differences derivative information. For example, and in one embodiment, the derivative information can be velocities and/or accelerations for position data. Example of gradient information can be heat gradient. flow gradient, and/or other types of gradient information.

Process 400 augments the low-fidelity data at block 406. In one embodiment, the virtual sensor data and/or derivative information is added to the low-fidelity data. At block 418, process 400 performs a dimension reduction for one-dimensional through three-dimensional input fields of the low-fidelity data. In one embodiment, this dimensional reduction can be performed using unsupervised machine learning or another machine learning technique. At block 408, for the augmented data and the reduced dimensional input fields, process 400 creates the data set $(x_l, y_l)$, which represents the low-fidelity data set model. In one embodiment, $x_l$ is the inputs for the low-fidelity model and $y_l$ is the low-fidelity outputs for the corresponding input. Using this data set, process 400 creates the low-fidelity model at block 410. In one embodiment, the low-fidelity model can be a machine learning model, such as a Gaussian model, neural differential equation model, and/or another type of machine learning model.

At block 412, process 400 predicts if the quality of the low-fidelity model is acceptable. In one embodiment, process 400 performs this prediction using a test data set and a threshold (e.g., a quality of 70% or some other metric for quality prediction). If the quality is within the threshold, process 400 outputs the low-fidelity model at block 416. If the quality is not within the threshold, process 400 requests more data at block 414. With the additional data, execution proceeds to block 402 above.

Figure 5:
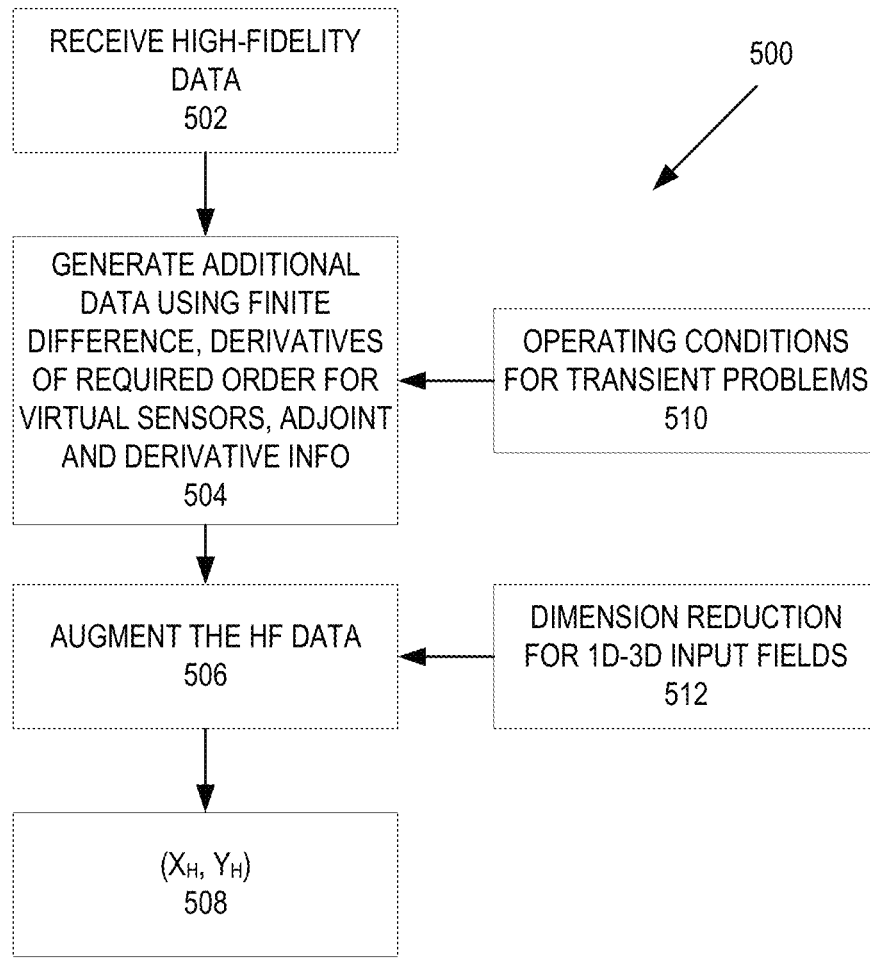
FIG. 5 is a flow diagram of one embodiment of a process to transform high-fidelity data by augmenting the data with features suitable for transient problems.

The high-fidelity can be augmented similarly to the augmentation of the low-fidelity data. FIG. 5 is a flow diagram of one embodiment of a process 500 to transform high-fidelity data by augmenting the data with features suitable for transient problems. In FIG. 5, process 500 begins by receiving the high-fidelity data at block 502. Process 500 collects operating conditions for transient problems at block 510. In one embodiment, these conditions are added to the conditions that are used to generate additional data at block 504. At block 504, process 500 generates additional data for the augmentation of the high-fidelity data using finite difference, derivative of required order for virtual sensors, adjoint and/or other derivative information. In one embodiment, process 500 can provide an estimation of the noise in this data and smooth out the noise. In a further embodiment, process 500 uses the operating conditions for the transient problems as generated in block 510 above. Alternatively, process 500 uses other conditions to generate the additional data.

At block 512, process 500 performs a dimension reduction for one-dimensional through three-dimensional input fields of the high-fidelity data. In one embodiment, this dimensional reduction can be performed using unsupervised machine learning or another machine learning technique. Process 500 augments the high-fidelity data at block 506. In one embodiment, process 500 augments the high-fidelity data using the additional data generated at block 504 above. At block 508, for the augmented data and the reduced dimensional input fields, process 500 creates the data set $(x_h, y_h)$, which represents the high-fidelity data set model. In one embodiment, $x_h$ is the inputs for the high-fidelity model and $y_h$ is the high-fidelity outputs for the corresponding input.

Figure 6:
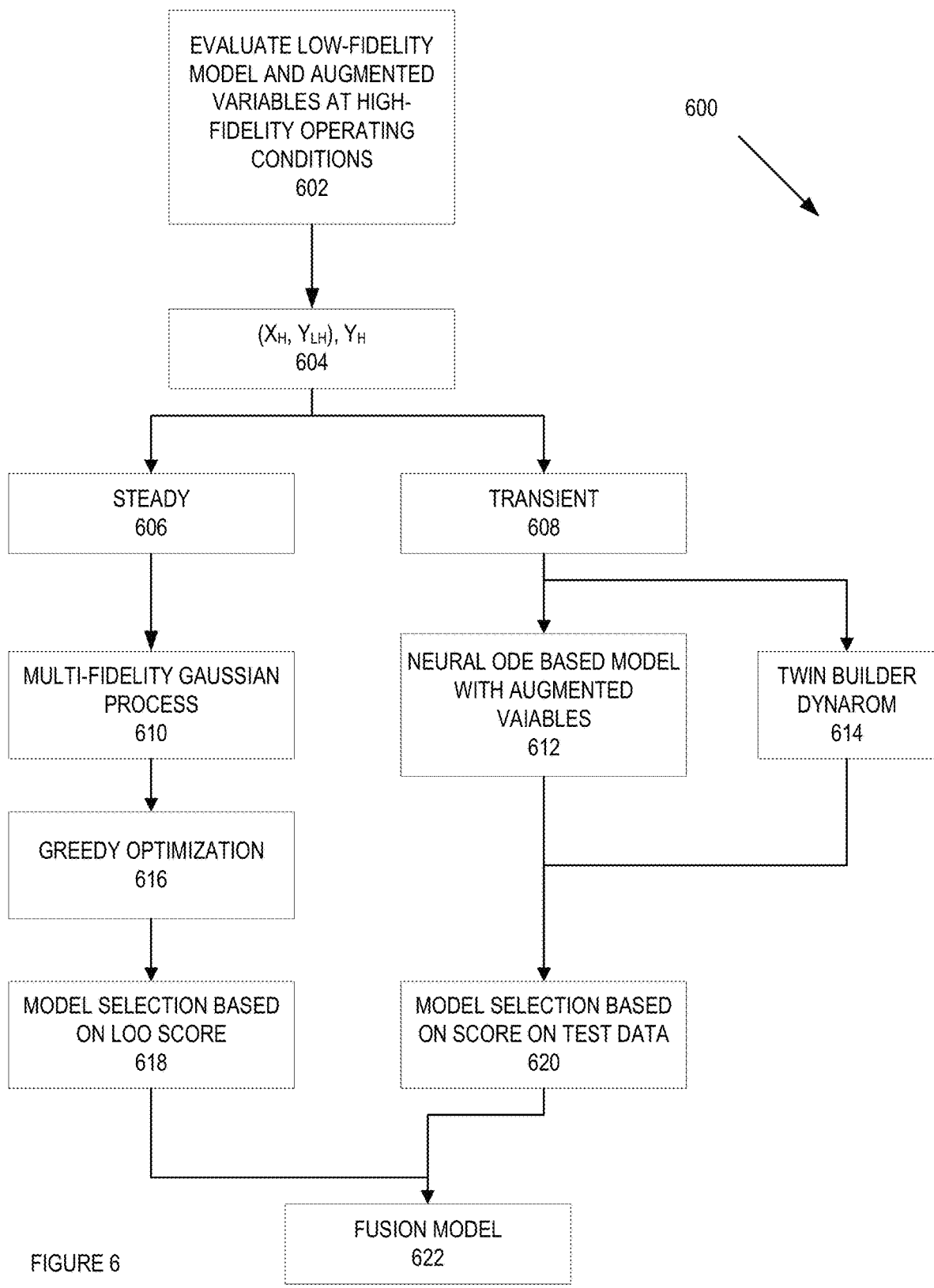
FIG. 6 is a flow diagram of one embodiment of a process to generate a machine learning based fusion model.

With the augmented low- and high-fidelity models, the fusion model can be generated. FIG. 6 is a flow diagram of one embodiment of a process 600 to generate a machine learning based fusion model. In FIG. 6, process 600 begins by evaluating the low-fidelity model and the augmented variables at high-fidelity operating conditions at block 602. In one embodiment, some or all of the high-fidelity input data is input into the high-fidelity data to generate output data that is more accurate using the low-fidelity model. Process 600 generates a new data set $((x_h, y_{th}), y_h)$, where $x_h$ is the high-fidelity input data that is used to generate to type of output data, $y_{lh}$ that is the high-fidelity output data using the low-fidelity model and $y_n$ that is the original high-fidelity output data of the high-fidelity model. With this data set, process 600 can split to handle a steady state flow of operations (blocks 606, 610, 616, and 618) and transient flow of operations (608, 612, and 620) that are used to generate the fusion model.

Process 600 begins the steady state operations (block 606) at block 610, where process 600 performs a multi-fidelity Gaussian process to generate multiple contenders for the low-fidelity data set. In one embodiment, there are five or six contenders generated from the low-fidelity, although in other embodiment, there can be more or less contenders generated. For example, and in one embodiment, different models for low-fidelity models differ in the kernels that are used in the Gaussian processes, namely, the Radial Basis Function (RBF), Rational Quadratic (RQ), the Matern kernel, and the periodic Kernel. Each of these kernels is also paired with a mean function that is typically one with Zero mean, a Linear mean and a mean based on a Neural network. With these contenders, process 600 performs a greedy optimization to generate a metric for each of the contenders at block 616. In one embodiment, the metric is a leave one out score. At block 614, process 600 uses a twin builder process to generating a transient reduced order model. The output of the twin builder process is fed into block 618 below. At block 618, process 600 selects a steady-state model based on the metric score. In one embodiment, process 600 selects a steady-state model based on the leave one out score.

For the transient operations (block 608), process 600 begins at block 612, where process 600 performs a neural ordinary differential equations (ODE) model. Process 600 select a high-fidelity model on a score for the test data at block 620.

With the low-fidelity model and the high-fidelity model chosen by process 600, process 600 creates the fusion model at block 622. In one embodiment, process 600 predicts output data $y_{l\_e}$ using the LFSM for $x_l$. The model process 200 additionally creates an augmented set of input data, $x_a$. by using $[x_h, y_{l\_h}]$ for training and testing of the augmented data. Process 600 trains multiple kernels with $[x_{h\_train}, y_{h\_train}]$. With each model, process 600 predicts $y_{hp\_test}$ for $x_{a\_test}$, where process 600 selects a kernel with the regression score (e.g., R2 value) from $[y_{h\_test}, y_{hp\_test}]$. This becomes the fusion predictive score. Model process 600 rebuilds the fusion model with $[x_a, y_h]$. In one embodiment, this rebuilt model is the fusion model.

Figure 7A:
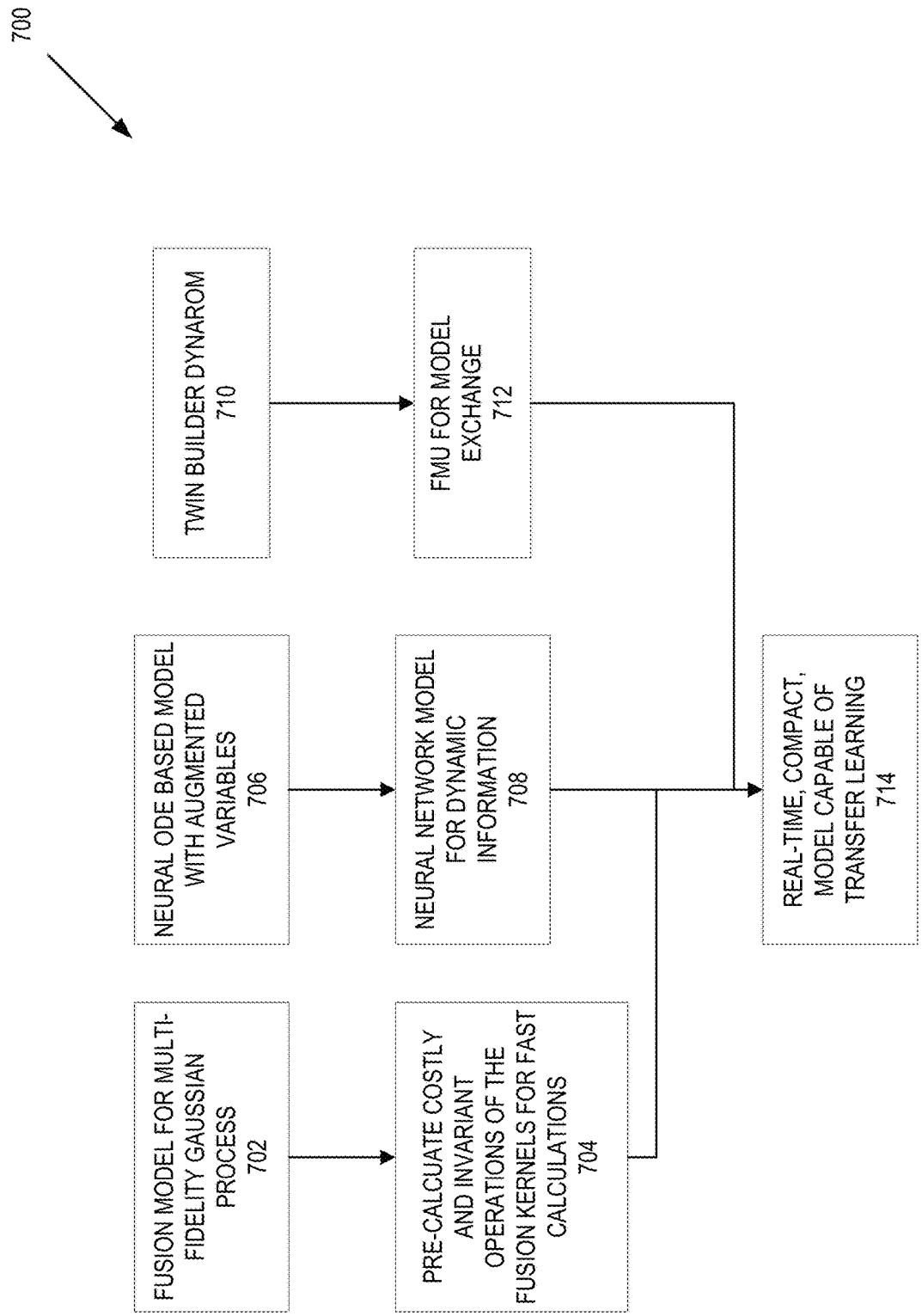
FIG. 7A is a flow diagram of one embodiment of a process to create a real-time model inferences for product validation and enable digital twins.

With the fusion model created, the fusion model can be used for various different purposes. FIG. 7A is a flow diagram of one embodiment of a process 700 to create real-time model inference for product validation and enable digital twins. In FIG. 7, process 700 begins by using the fusion model for multi-fidelity Gaussian processes at block 702. At block 704, process 700 pre-calculates costly invariant operations of the fusion kernels for fast calculations. In one embodiment, the invariant operations are operations that stay for a given time period or a number or model processes. By pre-calculating these invariant operations, the invariant operations are available for other operations and do not need to be re-calculated.

At block 706, process 700 generates a neural ODE based model with the augmented model. In one embodiment, a Neural ODE represents the transient data as a dynamic process, with the forcing function replaced by a Neural network with appropriate hidden layers and activation functions. The weights and biases of the neural network are determined using back propagation. Process 700 further generates a neural network model with dynamic information. In one embodiment, process 700 uses the equation $dy_h/dt=f(x, y, y_l)$ and replaces $f(x, y, y_l)$ with the Neural network and determined using back-propagation. At block 712, process 700 generates an FMU for model exchange. With the pre-calculated invariant operations, the neural network model for dynamic information, and the FMU for model exchange, process 700 has generated a real-time, compact model capable of transfer learning at block 714.

Figure 7B:
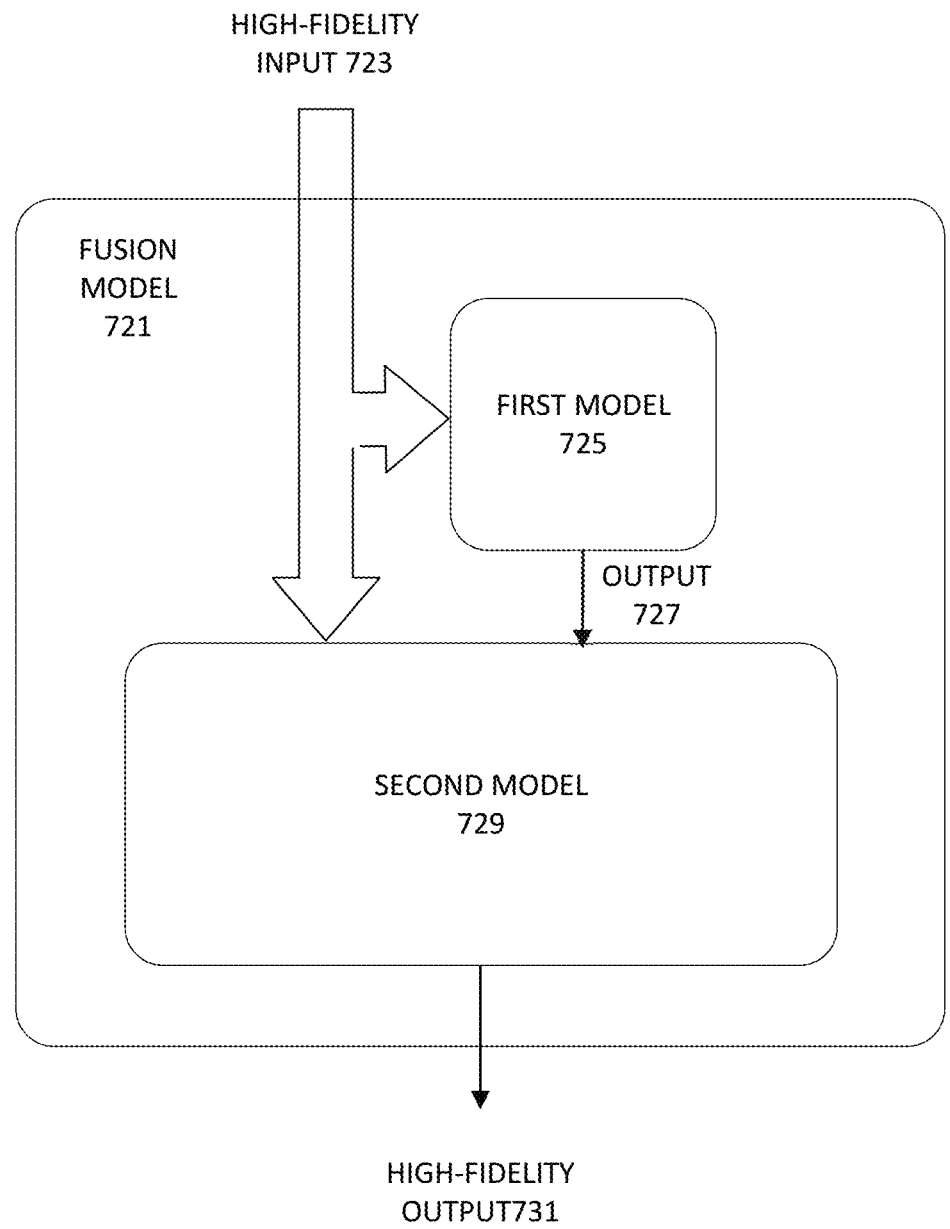
FIG. 7B is a block diagram illustrating an exemplary model configuration as a fusion model for a physical system.

FIG. 7B is a block diagram illustrating an exemplary model configuration as a fusion model for a physical system. For example, fusion model 721 may comprise a first model 725 coupled with a second model 729 to predict or generate a high-fidelity output 731 for simulating the physical system according to the high-fidelity input 723 received. The first model 725 or second model 729 may comprise trainable system models based on, for example, neural networks, reduced-order models, or other applicable machine-learning models. The first model 725 may receive the high-fidelity input 723 to generate an output 727 characterizing low-fidelity features (e.g. steady state characteristics) of the physical system. The second model 729 may receive an input comprising the high-fidelity input 723 augmented with the output 727 from the first model 725 to generate a high-fidelity output 731. The fusion model 721 can better simulate or predict high fidelity behaviors of the physical system utilizing the first model 725 trained with low-fidelity data of the physical system without requiring the low-fidelity input data. In some embodiments, the high-fidelity input 723 may include the original high fidelity input data updated (or transformed, augmented) with additional simulation or measurement data of the physical systems (e.g. based on virtual sensors or derived based on gradient calculations, etc.).

The subject matter described herein provides many technical advantages. As described herein, the computer-based techniques of the present disclosure improve the functioning of a computer system as compared to conventional approaches because the techniques described herein enable a fusion model generation that is more efficient in generating results for the physical system (e.g., faster, with smaller memory and processing requirements) as versus the conventional approaches. Using a full complex model can still be used, but the fusion model is more compact meaning that the fusion model is more efficient to use for a simulation. The computer-based techniques achieve such improvements while alleviating the need for expensive and time consuming physical model simulations that can be used. This is enabled by employing pattern matching and other techniques described herein.

Figure 8:
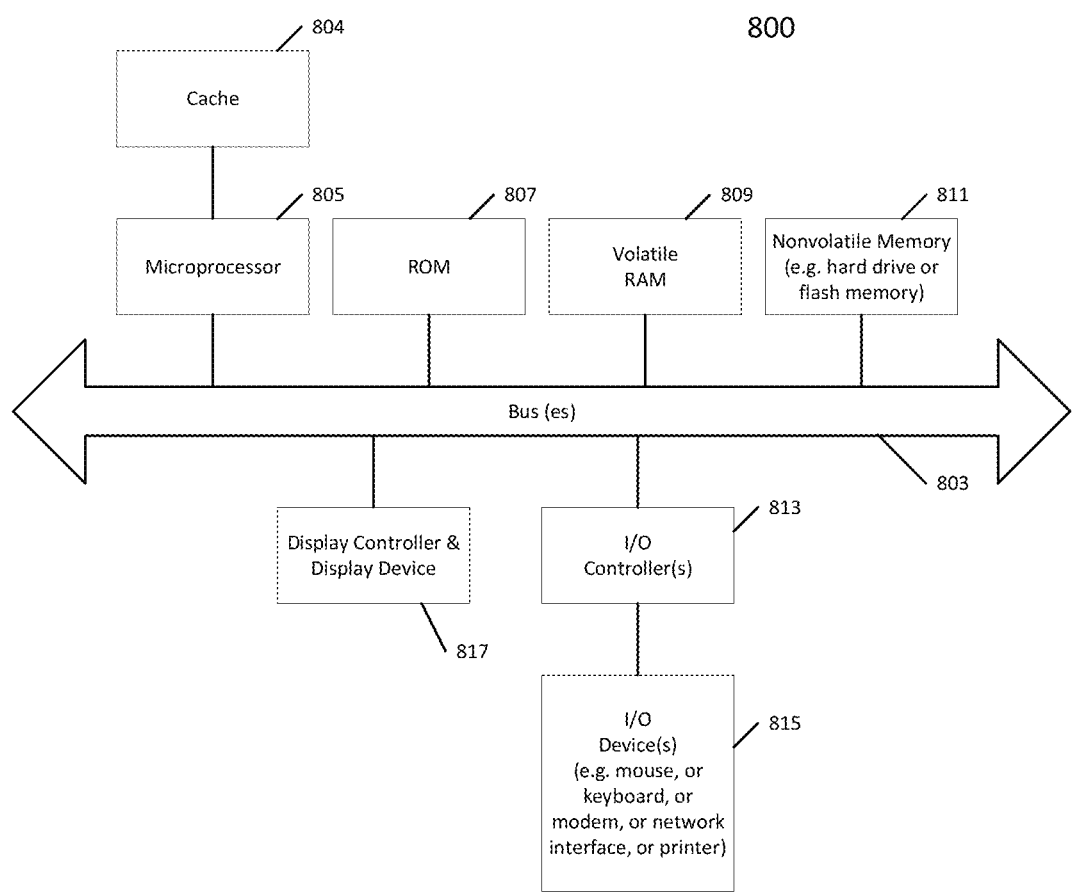
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented as a system that includes a model processing device 102 as shown in FIG. 1 above. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may include one or more CPU(s), GPU(s), a specialized processor, and/or a combination thereof. The microprocessor 805 may retrieve the instructions from the memories 807, 809, 811 and execute the instructions to perform operations described above. The bus 803 interconnects these various components together and also interconnects these components 805, 808, 809, and 811 to a display controller and display device 818 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 808 is typically implemented as dynamic RAM (DRAM), which requires power continually in order to refresh or maintain the data in the memory.

The mass storage 811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "training," "creating," "simulating," "forwarding," "retrieving," "checking," "allowing," "augmenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method of generating a machine learning fusion model for a physical system, the method comprising:
receiving low-fidelity input data and low-fidelity output data that represent a low-fidelity measurement of a physical system;
training a first model to predict the low-fidelity output data using the low-fidelity input data;
receiving high-fidelity input data and high-fidelity output data that represent a high fidelity measurement of the physical system;
invoking the first model with the high-fidelity input data to generate predicted low-fidelity data;

training a second model to predict the high-fidelity output data using the high-fidelity input data augmented with the predicted low-fidelity data, wherein an input to the second model includes the high-fidelity input data and the predicted low-fidelity data; and creating a fusion model for the physical system based on the first model and the second model, the first model and the second model to receive input to the fusion model, the second model to receive output from the first model, and output of the fusion model corresponding to output of the second model.

2. The non-transitory machine-readable medium of claim 1, wherein the method further comprises:
augmenting low-fidelity data set as the low-fidelity input data and the low-fidelity output data.

3. The non-transitory machine-readable medium of claim 2, wherein the low-fidelity data set is augmented with virtual sensor data.

4. The non-transitory machine-readable medium of claim 3, wherein the virtual sensor data is a virtual measurement of data in a physical model.

5. The non-transitory machine-readable medium of claim 2, wherein the low-fidelity data set is augmented with gradient information.

6. The non-transitory machine-readable medium of claim 1, wherein the method further comprises:
augmenting high-fidelity data set as the high-fidelity input data and the high-fidelity output data.

7. The non-transitory machine-readable medium of claim 6, wherein the high-fidelity data set is augmented with gradient data.

8. The non-transitory machine-readable medium of claim 7, wherein the gradient data includes one or more of finite difference data, virtual sensor gradient data, or adjoint information.

9. The non-transitory machine-readable medium of claim 1, wherein the first model is a steady-state model and the second model is a transient model.

10. The non-transitory machine-readable medium of claim 1, wherein the first model is selected from a plurality of low-fidelity models and the second model is selected from a plurality of high-fidelity models.

11. A method of generating a machine learning fusion model for a physical system, the method comprising:
receiving low-fidelity input data and low-fidelity output data that represent a low-fidelity measurement of a physical system;
training a first model to predict the low-fidelity output data using the low-fidelity input data;
receiving high-fidelity input data and high-fidelity output data that represent a high fidelity measurement of the physical system;
invoking the first model with the high-fidelity input data to generate predicted low-fidelity data;
training a second model to predict the high-fidelity output data using the high-fidelity input data augmented with the predicted low-fidelity data, wherein an input to the second model includes the high-fidelity input data and the predicted low-fidelity data; and
creating a fusion model for the physical system based on the first model and the second model, the first model and the second model to receive input to the fusion model, the second model to receive output from the first model, and output of the fusion model corresponding to output of the second model.

12. The method of claim 11, further comprising:
augmenting low-fidelity data set as the low-fidelity input data and the low-fidelity output data.

13. The method of claim 12, wherein the low-fidelity data set is augmented with virtual sensor data.

14. The method of claim 13, wherein the virtual sensor data is a virtual measurement of data in a physical model.

15. The method of claim 12, wherein the low-fidelity data set is augmented with gradient information.

16. The method of claim 11, further comprising:
augmenting high-fidelity data set as the high-fidelity input data and the high-fidelity output data.

17. The method of claim 16, wherein the high-fidelity input data and the high-fidelity output is augmented with gradient data.

18. The method of claim 17, wherein the gradient data includes one or more of finite difference data, virtual sensor gradient data, or adjoint information.

19. The method of claim 11, wherein the first model is a steady-state model and the second model is a transient model.

20. The method of claim 11, wherein the first model is selected from a plurality of low-fidelity models and the second model is selected from a plurality of high-fidelity models.

* * * * *